No. 637,717. Patented Nov. 21, 1899.
H. M. DU BOIS.
VEHICLE TIRE.
(Application filed May 11, 1899.)
(No Model.)
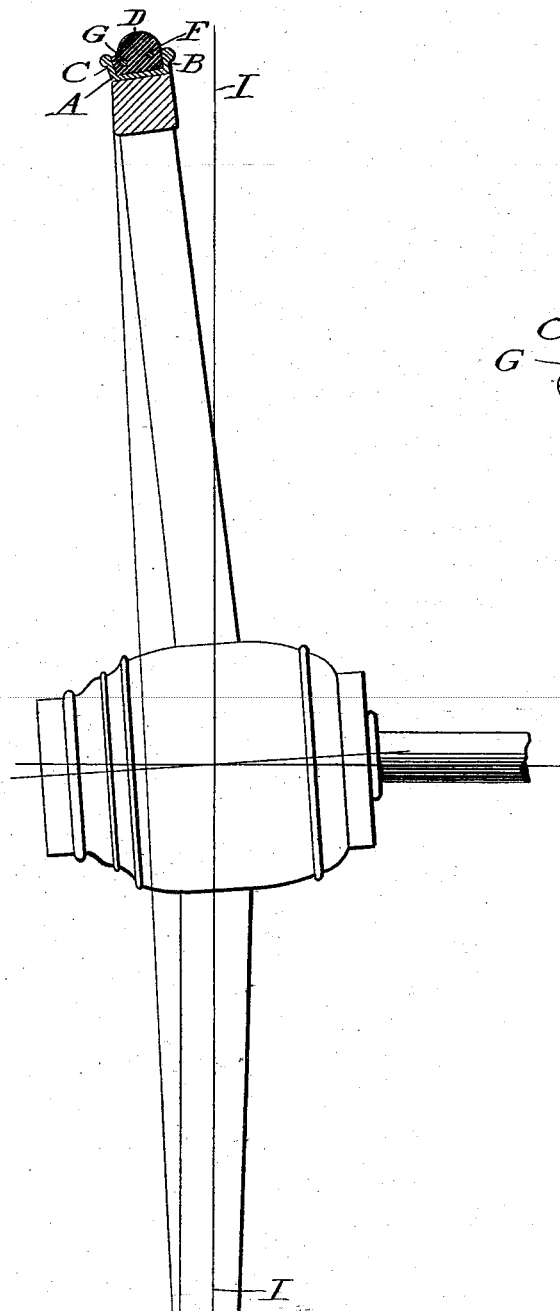
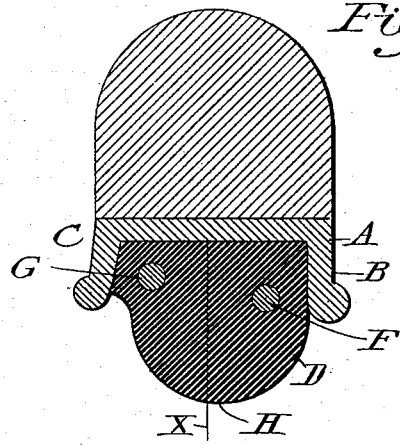
Fig. 2.
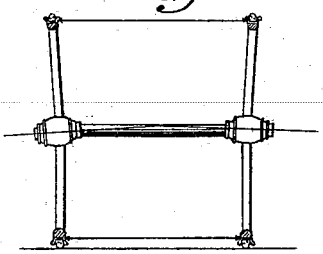
Fig. 4.
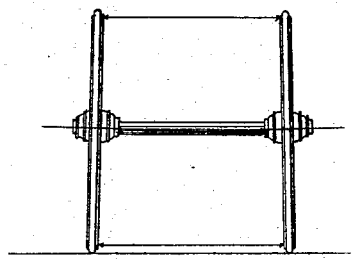
Fig. 3.
Witnesses:
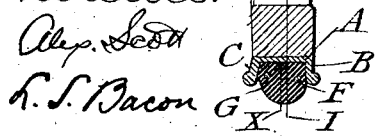
Inventor:
Howard Malcolm Du Bois

UNITED STATES PATENT OFFICE.

HOWARD MALCOLM DU BOIS, OF ASHBOURNE, PENNSYLVANIA.

VEHICLE-TIRE.

SPECIFICATION forming part of Letters Patent No. 637,717, dated November 21, 1899.

Application filed May 11, 1899. Serial No. 716,456. (No model.)

*To all whom it may concern:*

Be it known that I, HOWARD MALCOLM DU BOIS, a citizen of the United States, residing at Ashbourne, Montgomery county, in the State of Pennsylvania, have invented new and useful Improvements in Metal Tires and in Rubber Tires for Wheels, of which the following is a specification.

The object of this invention is to construct tires for wheels so proportioned as to accord with the mechanical principles of the vehicle, and thus avoid unnecessary strain upon the wheel, diminish the resistance to the motion of the wheel, and reduce the wear and strain upon the rubber tire while in action.

The accompanying drawings illustrate the invention.

Figure I is an edge view of the wheel. Fig. II is a cross-section of the wooden felly, the grooved metal tire, and the rubber tire. Fig. III is a top edge view of two wheels of a vehicle. Fig. IV is a front edge view of two wheels of a vehicle.

To fully understand the scope of this invention, a knowledge of the mechanical principles observed in the construction of vehicles is necessary. Vehicles are so constructed that the friction of the wheel is reduced to a minimum and also so that the wheels and tires may be strong to resist the opposing forces. To accomplish this, the axles are set with what is called in the art "gather"—that is to say, the axles of the wheels are inclined slightly forward from the collar to the point, so that the distance between the wheels is less in front than back. (See Fig. III.) The wheel when in motion is thus caused to press against the collar of the axle, the draft is brought to a fixed point, and the motion of the wheel made steady. The axles are also set with what is called "swing." To accomplish this, the spokes are inclined inwardly from the felly to the hub, so that the wheels from an outer point of view are concave in form or dished. The axles are inclined downward to an extent equaling the dish of the wheel. (See Fig. IV.) The "plumb spoke" is thus secured—that is, the spoke which supports the load and is directly in the line of weight stands plumb and the weight is thrown upon the center of the box, which is secured in the hub of the revolving wheel.

The rubber tires heretofore made have been so formed that the apex of the tire, which first comes in contact with the pavement, is at a point perpendicular to the center of the channel or tire. When such a rubber tire is placed on the wheels of a vehicle constructed in the way above mentioned, so that the wheels will have sufficient swing to secure a plumb spoke and sufficient gather to reduce the draft to a minimum, the weight of the load in the vehicle flattens the rubber at the point of contact, and as the wheel revolves forward the rubber is forced inward over the edge of the channel, thus changing the line of weight from the center of the box of the wheel inwardly toward the collar of the axle. When a vehicle turns a corner, the wheels which describe the outer circle are whirled about with great centrifugal force, the weight of the load shifts outward, and the rubber tire, which clings to the pavement, is pushed inwardly, while the wheels which describe the inner circle are so acted upon by the momentum and the shifting of the center of gravity of the vehicle that the rubber tires are forced outward. When the rubber flows outward over the flange, the force of the lever, the flange being the fulcrum, is exerted against the dish of the wheel in a direction opposite to that which the wheel is made to resist, thus causing the spokes to weaken, and at the same time causing an extraordinary strain upon the inner retaining-wire. To overcome these difficulties, I have constructed a tire which is supported, strengthened, and shaped as follows: About the wheel is fastened a grooved metal tire A, with flanges inclined at any angle desirable. The edges of the flanges are round to prevent abrasion of the rubber. The inner flange B is longer than the outer flange C. Into the groove of the metal tire the rubber tire D is fitted. It is held in place within the groove by two wires G and F. More wires may be used, if desired. The wires are drawn through holes extending throughout the length of the rubber tire. The outer wire G is preferably equidistant from the base and flange of the metal tire, whereas the inner wire F is more distant from the base of the metal tire than the wire G. The wires are secured and tightened by welding, twisting, or other convenient method. The rubber tire D is concave from its apex to the point of contact with the long inner flange, while it is slightly S-shaped from the apex to the point of contact with the outer flange C. The apex of the tire is at the point H, which is inward from the line X, erected perpendicular to the center of the metal tire A. Thus the greater bulk of the rubber tire is inward from the perpendicular line X. The rubber tire must withstand three forces—first, the upward-pushing force against the line of weight; second, the inward-pushing sidewise force caused by the gather of the wheels, and, third, the outward-pushing sidewise force caused when the inner wheels of the vehicle turn a corner. The inward force exerted because of the gather of the wheel is resisted by the long inner flange B of the metal channel, which prevents the rubber from flowing inward over the flange and which also relieves the strain upon the outer wire G. The wire G, when unassisted, tends to cut through the rubber. The outward force is so opposed by the inner retaining-band F, which is placed higher in the body of the rubber than the other retaining-wire, that it cannot be pushed beyond the line of weight I. This placement of the retaining-wire F in a different plane from the metal tire than the wire G increases the strength of the rubber in cross-section and permits freer movement of the molecules of rubber. When the metal tire is placed about the wheel, it is expanded by heat. Because of the greater weight of the inner edge of the metal tire when the metal is cooled a greater pressure is exerted upon the inner edge of the wooden felly of the wheel than upon the outer edge. This restrains the wheel from excessive dish. The tire thus constructed and protected is confined within the metal flanges and never forced between the flanges and the pavement. Thus unnecessary dragging of the rubber and resistance to the motion are prevented. Such a tire is in accord with the principles of plumb spoke and gather, which cause the force exerted against the inner metal flange to be opposed by the plumb spoke of the wheel. Furthermore, it prevents the line of weight from moving from the center of the box of the wheel, thus avoiding unnecessary strain and friction.

What I claim as my invention, and desire to secure by Letters Patent, is—

1. A rubber tire for a vehicle, fitted into a groove or flanged metal tire in which the inner flange is longer than the outer flange, so shaped that the part resting upon the road-bed shall have its center inward from the center of the metal tire and kept in place by means of wires which are tightened about the wheel through holes in the rubber, each hole being in a different horizontal plane from the base of the metal tire, substantially as hereinbefore described.

2. A rubber tire so shaped that the greater bulk of the rubber is inward from a line erected perpendicular to the center of the plane of the metal channel upon which the tire rests, substantially as hereinbefore described.

3. A vehicle-wheel with a flanged metal tire the flange inward toward the vehicle being longer than the outer flange, so that a rubber tire, shaped with the greater bulk of the rubber inward from a plane perpendicular to the central point of the metal tire, when fastened in the metal channel, will bear against the longer flange, substantially as shown and for the purposes specified.

4. A vehicle-wheel with a flanged metal tire in which the flange inward toward the vehicle is heavier than the outer flange, so that a rubber tire, shaped with the greater bulk of the rubber inward from a plane perpendicular to the center of the metal tire, will bear against the heavier flange, substantially as shown, for the purposes specified.

5. A rubber tire having holes throughout its length through which retaining-wires extend, each in a different horizontal plane, substantially as shown for the purpose specified.

6. A vehicle-wheel with a flanged metal tire, in which the flange inward toward the vehicle is longer and heavier than the outer flange, into which metal tire is fitted a rubber tire, shaped with the greater bulk of the rubber inward from a plane perpendicular to the center of the metal tire, so that the rubber will bear against the long heavy flange, the rubber being held in place by two or more wires extending through the rubber about the wheel, substantially as described and for the purpose specified.

In testimony whereof I affix my signature in the presence of two witnesses.

HOWARD MALCOLM DU BOIS.

Witnesses:
DAVID C. BENNETT, Jr.,
CHARLES W. MCCANDLESS.